No. 827,409. PATENTED JULY 31, 1906.
C. H. & E. H. BENTLEY.
PIPE JOINT FOR EARTHENWARE, &c.
APPLICATION FILED NOV. 24, 1905.

WITNESSES
Abu Reed
Wilfred Alderson

INVENTORS
Charles Henry Bentley
Ernest Haigh Bentley
per John S. Walsh
Attorney

UNITED STATES PATENT OFFICE.

CHARLES HENRY BENTLEY AND ERNEST HAIGH BENTLEY, OF HALIFAX, ENGLAND.

PIPE-JOINT FOR EARTHENWARE, &c.

No. 827,409.

Specification of Letters Patent.

Patented July 31, 1906.

Application filed November 24, 1905. Serial No. 288,961.

*To all whom it may concern:*

Be it known that we, CHARLES HENRY BENTLEY and ERNEST HAIGH BENTLEY, subjects of the King of Great Britain, residing at Halifax, in the county of York, England, have invented new and useful Improvements in Pipe-Joints for Earthenware and other Suitable Pipes, of which the following is a specification.

This invention is more particularly applicable to earthenware pipes, but is equally suitable for gas or water pipes; and our object is to construct a joint for these pipes which is self-adjusting to a correct alinement, can be more easily and quickly laid, may be laid by unskilled labor, and while rendering leakage impossible the making of said joint greatly strengthens the pipe at this part. We attain these objects in the manner illustrated in the accompanying drawings, in which—

Figure 1:
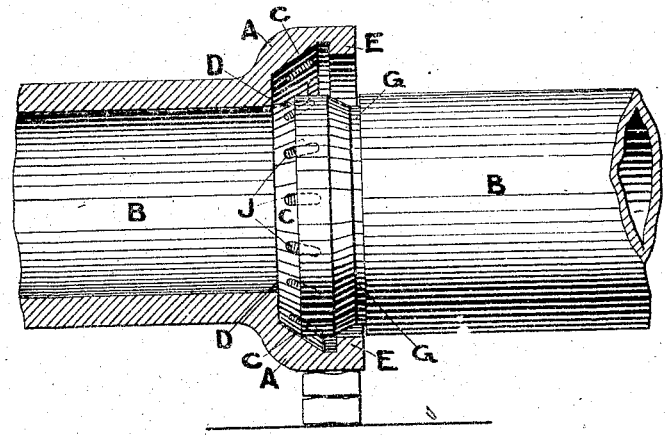
Figure 2:
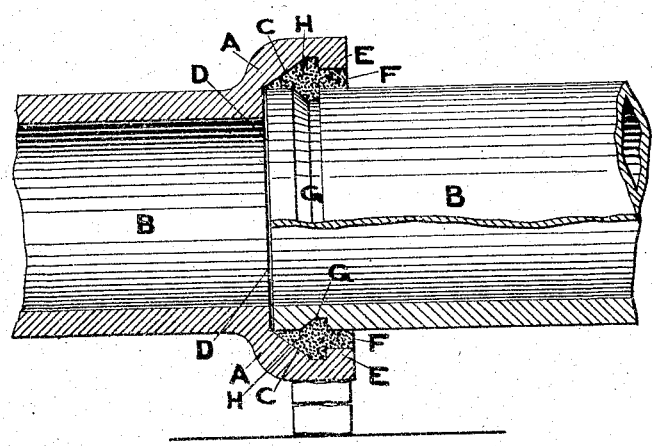

Figure 1 is an elevation, partly in section, of our improved pipe-joint, showing the insertion of the spigot end of pipe preparatory to adjustment. Fig. 2 is a similar view to Fig. 1, but with the spigot end in position and the joint completed.

Similar letters refer to similar parts throughout both the views.

In constructing our improved joint we form the socket A of each pipe B with an inner conical or taper face C, having a straight bed or seating D at its narrowest part, so that when the next length of pipe is joined up its inner surface is flush with or in alinement with that of the pipe already laid. (See Fig. 2.) Also the socket A is further provided with an inner flange or rim E, sufficiently deep yet permit of the ready insertion of the spigot end of the next pipe and provide the required clearance or opening F for the introduction of the binding material.

At the spigot end of each pipe is a suitable annular recess or neck G of a shape or section corresponding with the taper or inner face C of socket, so that when two pipes are in position an annular chamber, miter, dovetail, or arrow-head in shape or section encircles the spigot end. This chamber is filled with cement, lead, or other binding material H. Grooves J are provided in the socket to equalize and counteract the effect of any contraction of the binding material and prevent the same from twisting loose.

The taper or conical face C also serves to guide the spigot end onto its seat upon inserting the pipe. (See Fig. 1.) The pipe end bears against said face and slides up onto its seat D. When no further forward movement is possible, the pipe is butt up and ready for the cement or other filling.

The clearance or space F between the inner flange or rim E in the socket and the spigot end of pipe being less than the cement-chamber at its greatest diameter, the binding material when set renders any subsequent movement of the pipes in any direction an impossibility. Therefore a perfect joint of great strength and as durable as the pipes themselves is obtained. Further, there is no possibility of spigot dropping when laying or fixing the pipes, as the taper face in the socket supports the spigot end until the filling has been applied and the joint completed, and as the said spigot end also abuts against its seating D no cement or other filling can pass into the pipes.

What we claim as our invention, and desire to secure by Letters Patent, is—

The combination, with a pipe-section having a socket provided with a flat surface D at its bottom, an internally-projecting flange E at its top, and a conical surface C arranged between the said surface and flange and provided with longitudinal grooves; of a cylindrical pipe-section having no bead or projection but having a circumferential groove having a conical side and a straight side, said conical side being opposite the conical surface C and said straight side being in line with the inner edge of the flange E when the end of the pipe abuts against the flat surface D, a packing-space being formed which is narrower between the said flange and pipe than between the bases of their said conical surfaces.

In testimony whereof we have hereunto affixed our signatures in the presence of two witnesses.

CHARLES HENRY BENTLEY.
ERNEST HAIGH BENTLEY.

Witnesses:
A. REED,
WILFRED ALDERSON.